Aug. 2, 1949.  E. B. DOOLIN  2,477,968
PACKAGE SEALING MACHINE
Filed April 6, 1948  3 Sheets-Sheet 1
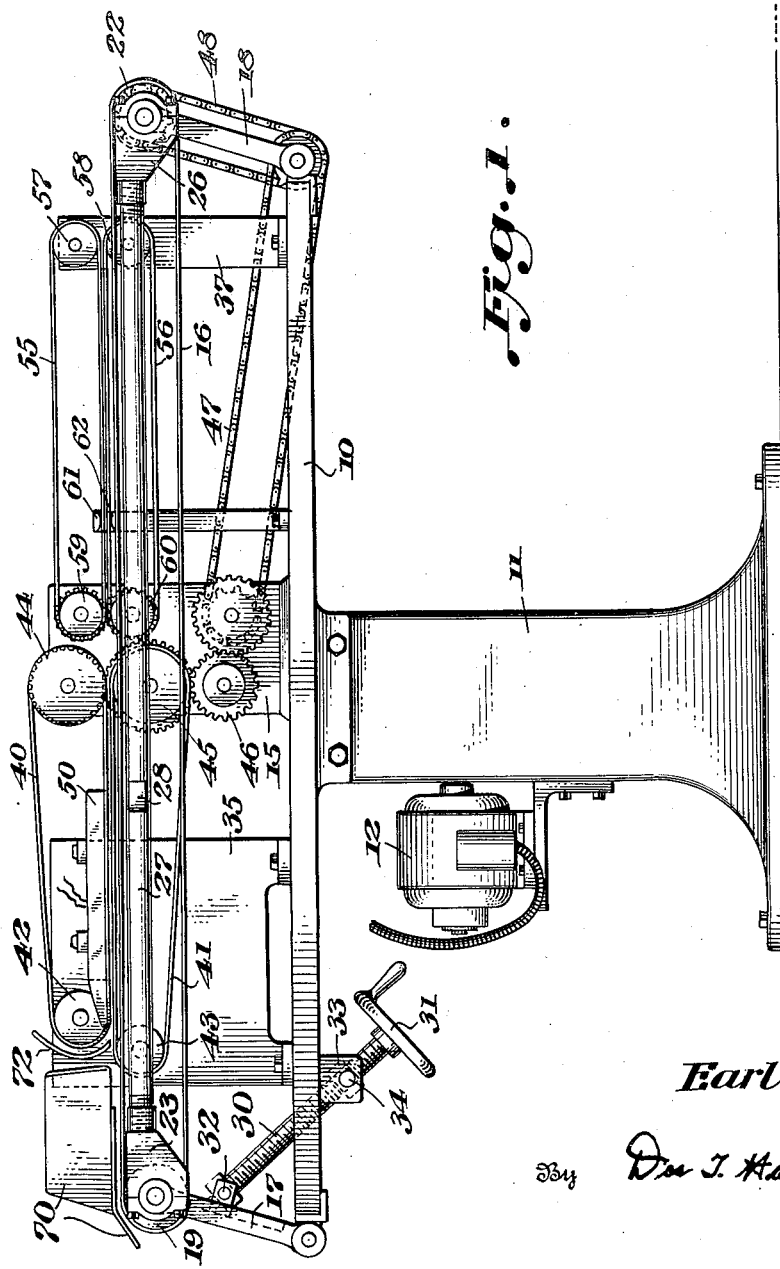
Inventor
Earl B. Doolin,
By Dos T. Hatfield
atty.

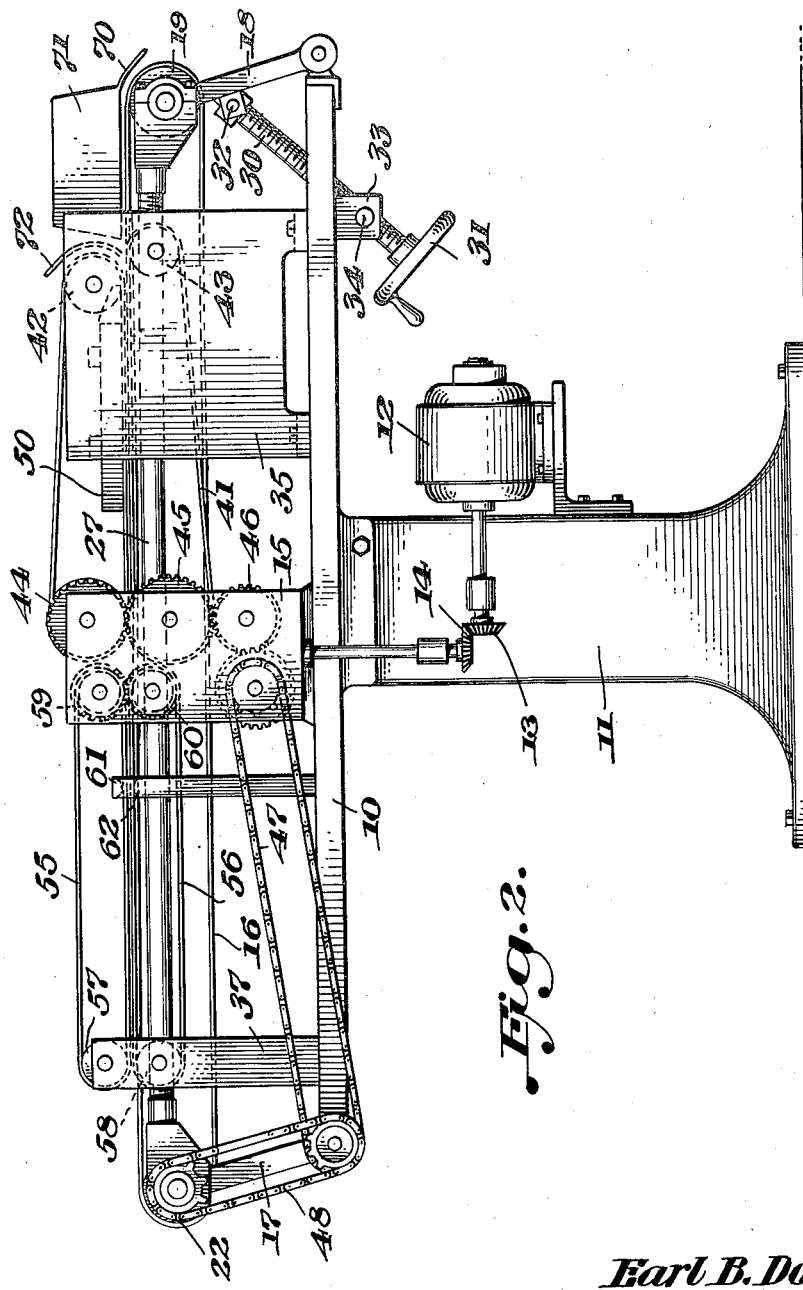

Aug. 2, 1949.　　　　　E. B. DOOLIN　　　　　2,477,968
PACKAGE SEALING MACHINE
Filed April 6, 1948　　　　　　　　　　　　3 Sheets-Sheet 3
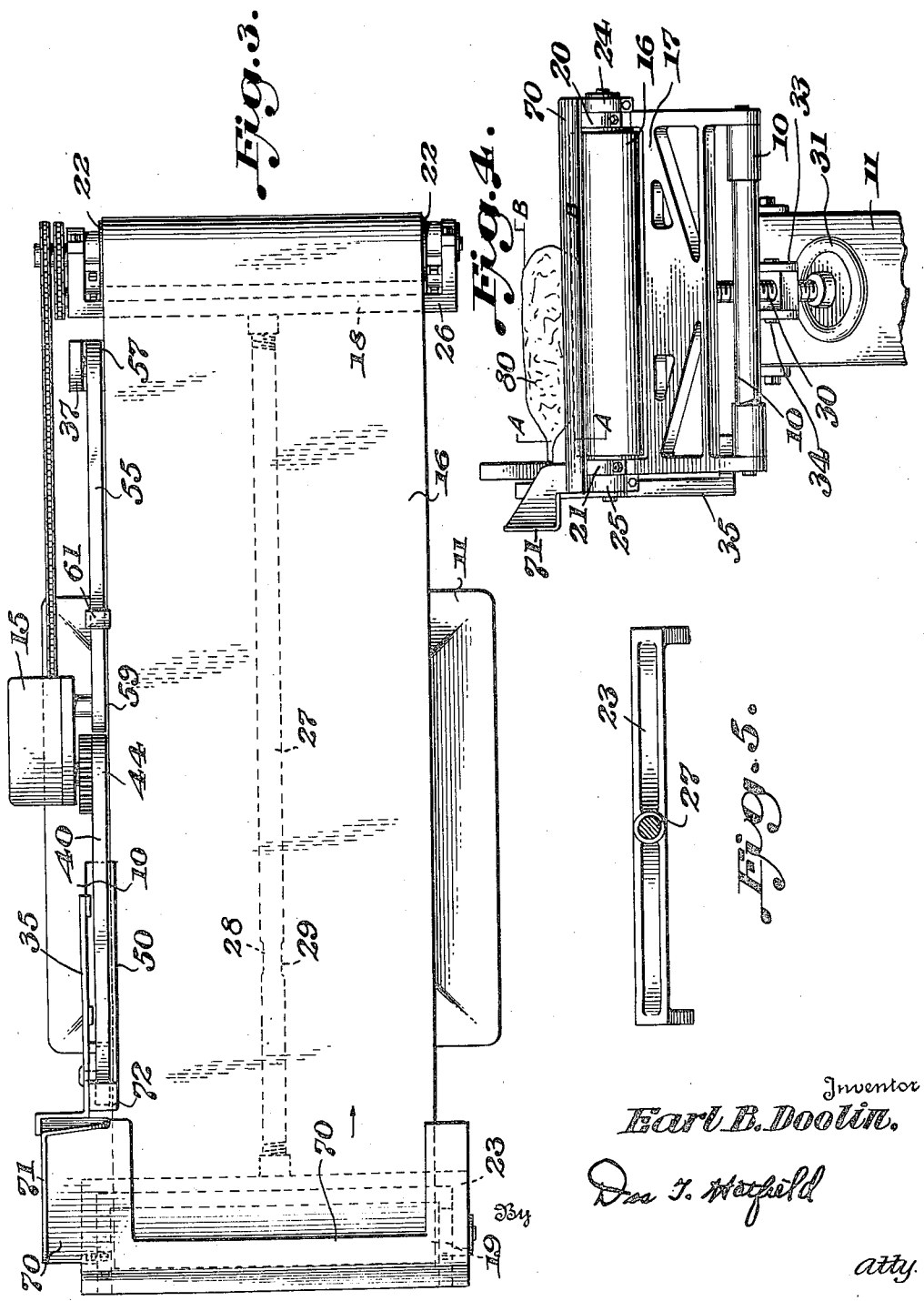
Inventor
Earl B. Doolin.
atty.

Patented Aug. 2, 1949

2,477,968

UNITED STATES PATENT OFFICE 2,477,968

PACKAGE SEALING MACHINE

Earl B. Doolin, Dallas, Tex.

Application April 6, 1948, Serial No. 19,267

8 Claims. (Cl. 154—42)

This invention relates to package sealing machinery and more particularly to improvements in package sealing machinery of the type in which a package of heat sealable material may be conveyed through the machine with its folded portions to be sealed in operative contact with suitable heat sealing members.

Prior to this invention, many foods such as corn products, potato chips and the like have been packaged for sale in transparent, heat sealable wrappers in a manner which affords the dual advantages of permitting the contents of the package to be viewed and of maintaining the freshness of the food over relatively long periods of time. Many forms of heat sealing machinery have been devised to apply the requisite heat and pressure to the folded mouth or lip portions of a heat sealable bag, and in order to enable the sealing operation to be quickly performed upon a continuing succession of bags, most of the prior art sealing machinery employ some form of conveyor for carrying the bag and contents through the machinery with the bag portions to be sealed in operative relation to the heating and pressing members of the machinery. In the heat sealing machinery of the type to which this invention relates, the means for applying the heat and pressure to the sealable portions of the bag are necessarily fixed to the machinery frame. Therefore, prior to this invention, it was necessary to provide individually designed sealing machinery for each different size of bag and contents to be sealed. This should be understood when it is considered that in this type of sealing machinery the bag and contents is supported on its side on the conveyor surface which carries the bag through the machine with the folded lip portions above the plane of the conveyor and in operative relation to the heating and pressing members. Thus, in the prior art machines, bags of different sizes and thicknesses would be conveyed through the machine with the folded lip portions to be sealed at different heights above the plane of the conveyor, which, unless the lip portion were at the correct height corresponding to the fixed position of the heating and pressing members, would not provide an operative contact to effect a sealing of the bag and contents.

It is, therefore, a principal object of this invention to provide an improved form of heat sealing machinery of the general type previously described and having improved conveyor apparatus which may be easily and quickly adjusted with respect to the heating and pressing members to enable the machine to accommodate and effectively seal different sizes of heat sealable bags with their contents.

A preferred form of bag sealing machinery embodying the principles of this invention provides for a conveyor belt to carry and support a bag to be sealed, the conveyor belt being carried by driving and supporting rollers mounted upon an adjustable parallelogram framework including pivotal parallel links which enable the framework and conveyor belt to be raised and lowered in a plane parallel to the position of the sealing and pressing members and the plane of travel of the folded lip portions of the bag through the sealing and pressing members, to thus enable different thicknesses and sizes of bags to be sealed with the same machine.

Another important object of this invention is to provide an improved form of bag sealing machinery of the type having a conveyor for carrying the bag to be sealed through the machine in operative relation to the sealing apparatus including heating and pressing members, the moving plane of the conveyor being adjustable parallel to the plane of movement of the sealable bag portions through the sealing apparatus and the conveyor being further provided with means to adjust and maintain a desired conveyor belt tension at any adjusted plane of conveyor operation.

In the preferred form of bag sealing machinery embodying the teachings of this invention to obtain the above objects, the bag conveyor, which may be a wide fabric belt, is supported on and driven by a plurality of rollers mounted in an adjustable framework including a pair of pivotally connected, substantially parallel links such that the framework is essentially a parallelogram, the link sides of which may be raised or lowered to raise or lower in parallel planes the conveyor belt, and the belt side of the parallelogram being adjustable in length by an amount sufficient to slightly increase or decrease the distance between the conveyor belt ends of the parallel links and thus obtain the desired conveyor belt tension.

Further objects and advantages of this invention will be apparent with reference to the following specification and drawings in which:

Figure 1 is a front elevation of the bag sealing machine and showing the adjustable parallelogram framework for the conveyor belt;

Figure 2 is a back elevation of the machine to show the details of the machine framework for supporting the heating and pressing apparatus together with the conveyor gearbox and electric motor drive;

Figure 3 is a top plan view of the machine omitting the motor and drive connections for the sake of clarity in the drawings;

Figure 4 is an end view of the machine as seen from the bag feeding end and also omitting the electric motor and drive connections; and Figure 5 is a detail fragmentary view of one of the conveyor connecting yokes for interconnecting with a connecting rod the two conveyor rolls in an adjustable parallelogram framework.

Referring to the drawings, the bag sealing machinery of this invention is supported on a fixed frame or base member 10 which may be supported in a horizontal position on the floor pedestal 11 as shown. The floor pedestal 11 also supports, as shown, an electric motor 12 which is adapted to drive the conveyor and sealing apparatus in any suitable manner such as through the bevel gears 13 and 14 and the gear box 15 to be later described in greater detail. The fixed frame member 10 which constitutes the base member of an adjustable conveyor suporting parallelogram framework may be of a width substantially equal to the width of the bag conveyor belt 16. Rotatably journalled at each end of the base frame member 10 are the pivoted parallelogram frame link members 17 and 18, respectively, which may, if desired, be cast in a rigid unitary metal structure as seen in Figure 4 of the drawings. The frame link members 17 and 18 are of equal dimensions, as should be understood in order to provide a parallelogram framework. A conveyor belt roller 19 is rotatably journalled in the bearings 20 and 21 on the frame link 17 while the conveyor belt roller 22 is similarly journalled on the frame link 18. A connecting yoke member 23 is pivotally connected at 24 and 25 to the frame link member 17 and such connections may be made with the shaft ends of the conveyor roller 19 as the connecting pins. Similarly, a connecting yoke member 26 is pivotally connected to the frame link 18 and shaft ends of the conveyor roller 22. The connecting yoke members 23 and 26 are connected together by a threaded shaft or connecting rod 27 having a length substantially equal to the length of the base member 10. The connecting rod 27 is reversely threaded at each end such that it may be rotated to slightly vary the distance between the connecting yokes 23 and 26 and thus adjust the tension of the conveyor belt 16. Flat surfaces 28 and 29 may be provided on the connecting rod 27 to facilitate the application of a wrench or the like to rotate the rod and adjust the conveyor belt tension.

From the foregoing, it will be seen that the base frame member 10, the adjustable parallel frame links 17 and 18, and the connecting yokes 23 and 26 together with the threaded connecting rod 27 comprise an adjustable parallelogram conveyor belt frame which enables the conveyor belt 16 carried by the rollers 19 and 22 to be raised and lowered in a plane essentially parallel to the plane of the base frame member 10. To adjust the conveyor belt plane height above the base frame member 10 and to maintain the adjusted position, a threaded shaft 30 and handwheel 31 are provided. The threaded shaft 30 is fastened at one end through a pivotal connection 32 to the parallelogram frame link member 17 and is also threaded through the threaded collar 33 which is pivotally connected at 34 to a lug portion 35 of the base frame member 10. Thus by rotating the handwheel 31 and threaded shaft 30 in either direction, the parallelogram link member 17 may be raised or lowered to raise or lower the conveyor belt in a plane essentially parallel to the plane of the base frame member 10; and in view of the threaded connections at 33, the adjusted position will be maintained when the handwheel 31 is not rotated. It should be understood that other suitable means may be used to adjust the position of the parallelogram frame link member 17 or the link member 18 in place of the threaded shaft 30 and handwheel 31 which has been described in the preferred form of the invention. For example, a system of toggles and levers might be used for such purpose.

Vertically extending support members 36 and 37 are mounted on the base frame member 10 to support certain portions of the sealing apparatus including the heating and pressing members at a fixed position and height above the base frame member 10. The gear box 15 is also mounted upon the base frame member 10 and is also adapted to support certain portions of the heating and pressing members to be described. As will be seen in Figures 1, 2, and 3 of the drawings, a pair of cooperating heating and pressing endless belts 40 and 41 are carried to one side of the bag conveyor 16 in a position to engage the folded sealable end of a bag in the manner shown in Figure 4 of the drawings as it is being conveyed from the in-feed conveyor end adjacent the frame link 17. The heat sealing and pressing endless belts 40 and 41 are supported at a fixed position above the base frame member 10 and carried by the belt rollers 42 and 43 rotatably journalled on the supporting plate 36 and by the belt rollers 44 and 45 rotatably journalled in the gear box 15. The belt roller 44 is adapted to be driven at suitable speed providing a speed for the belt 40 equal to the speed of the conveyor belt 16 through the medium of any suitable gearing (not shown) within the gear box 15 and driven from the electric motor 12. The belt roller 44 is provided with gear teeth on one side face to engage similar gear teeth on the belt roller 45 and thus drive the belt 41. The gear teeth on belt roller 45 also engage the idler gear 46 which drives the transfer gear 47, sprocket chains 47 and 48, and thus the conveyor belt roller 22 and conveyor belt 16 at a speed approximately equal to the speed of the heat sealing and pressing belts 40 and 41. Any suitable form of electric sealing iron, such as generally shown at 50, may be fixed to the supporting plate 35 to heat the presser belt 40 and the folded lip portions of the bag to be sealed.

In order to maintain a pressure upon the heat sealed lip portions of the bag while they are cooling, a pair of presser belts 55 and 56 may be provided. The presser belts 55 and 56 are carried by the belt rollers 57 and 58 journalled on the support 37 and the belt rollers 59 and 60 journalled in the gear box 15. The roller 59 is driven by the electric motor 12 through the gear box 15 and is provided with gear teeth on one side to engage similar gear teeth on the roller 60 so that the presser belts 55 and 56 may be driven at speeds approximately equal to the speed of the conveyor belt 16. A pair of resilient fingers 61 and 62 are supported from the base frame member 10 to press the belts 55 and 56 together and thus apply pressure to the cooling heat sealed lip portions of the bag passing through the machine.

At the in-feed end of the machine, a metal protection apron 70 having a vertically extending side portion 71 is fastened by welding or otherwise to the supporting plate 35. Also fastened to the supporting plate 53 is a curved metal guide strip 72 which is effective to force the folded lip portions of a bag between the heat sealing and pressing belts 40 and 41. It will be noted that the belt roller 43 is positioned nearer the in-feed end of the machine than the belt roller 42 so that a bag to be sealed may be placed on the conveyor belt 16 in the position shown in Figure 4 with the folded lip portion extending towards the side of the conveyor to be picked up by the belt 41 and roller 43. Thus, when the bag to be sealed is moved into the machine as carried by the conveyor belt 16 and the sealing belt 41, the guide strip 72 will be effective to force the folded sealable bag portions between the sealing and pressing belts 40 and 41 and underneath the sealing iron 50. It will be noted, as shown in Figure 4, that the conveyor belt 16 should be adjusted in height above the base frame member 10 to provide a height A—A for the adjoining runs of the sealing belts 40, 41, 55, and 56 above the conveyor belt 16 when sealing a bag 80 having the height or thickness B—B above the conveyor belt 16. The may be easily adjusted by suitable operation of the handwheel 51 and threaded shaft 50, as previously described, so that the sealing machine may be used with different sizes of bags having a different thickness B—B and, hence, a different height A—A for the sealable lip portions above the conveyor belt 16.

It should be understood that this invention is not to be limited to the specific form of heat sealing apparatus disclosed, such as the specific driving means for the conveyor or sealing belt, nor to the particular form of heat sealing apparatus used, it being understood that the novel form of bag conveyor parallelogram framework may be used in combination with any type of conveyor driving means and sealing apparatus to obtain the benefits and objects of this invention as described and claimed in the appended claims.

I claim:

1. A package sealing machine comprising, in combination, conveyor means for moving a package to be sealed through the machine, means for sealing the sealable portions of the package as it is moved by said conveyor, the position of said sealing means in the machine being fixed, said conveyor being supported on an adjustable parallelogram framework to enable said conveyor to be adjusted in substantially parallel planes with respect to the position of said sealing means.

2. A package sealing machine comprising, in combination, endless conveyor means for moving a package to be sealed through the machine, means for sealing the sealable portions of the package as it is moved by said conveyor, the position of said sealing means in the machine being fixed, said conveyor being supported on an adjustable parallelogram framework, said parallelogram framework including a base member fixed to the machine in a desired plane with respect to the position of said sealing means and further including parallelogram link frame members of equal length pivotally connected to each end of the base member, the other ends of said link frame members being pivotally connected to the supporting rollers for said endless conveyor and to each other by a connecting rod of a length substantially equal to the length of the base frame member, and means to adjust the angular position of said link frame members with respect to said base member and thus adjust in parallel planes the position of said conveyor with respect to said sealing means.

3. A package sealing machine comprising, in combination, endless conveyor means for moving a package to be sealed through the machine, means for sealing the sealable portions of the package as it is moved by said conveyor, the position of said sealing means in the machine being fixed, said conveyor being supported on an adjustable parallelogram framework including a base member fixed to the machine in a desired plane with respect to the position of said sealing means and further including parallelogram link frame members of equal length pivotally connected to each end of the base member, the other ends of said link frame members being pivotally connected to the supporting rollers for said endless conveyor and to each other by a connecting rod of a length substantially equal to the length of the base frame member, said connecting rod being slightly variable in effective length to adjust the tension of said endless conveyor supported on said supporting rollers, and means to adjust the angular position of said link frame members with respect to said base member and thus adjust in parallel planes the position of said conveyor with respect to said sealing means.

4. A package sealing machine comprising, in combination, endless conveyor means for moving a package to be sealed through the machine, means for sealing the sealable portions of the package as it is moved by said conveyor, the position of said sealing means in the machine being fixed, said conveyor being supported on an adjustable parallelogram framework, said parallelogram framework including a base member fixed to the machine in a desired plane with respect to the position of said sealing means and further including parallelogram link frame members of equal length pivotally connected to each end of the base member, the other ends of said link frame members being pivotally connected to the supporting rollers for said endless conveyor, said other ends of said link frame members being also pivotally connected to each other by a reversely threaded connecting rod of a length substantially equal to the length of the base frame member whereby the rotation of said rod will be effective to vary the tension of the endless conveyor supported on said conveyor rollers, and means to adjust the angular position of said link frame members with respect to said base member and thus adjust in parallel planes the position of said conveyor with respect to said sealing means.

5. A package sealing machine comprising, in combination, endless conveyor means for moving a package to be sealed through the machine, means for sealing the sealable portions of the package as it is moved by said conveyor, said sealing means including a plurality of endless heating and pressing belts adapted to engage the sealable portions of the package, the operative plane of said heating and pressing belts being fixed in said machine, said conveyor being supported on an adjustable parallelogram framework, said parallelogram framework including a base member fixed to the machine in a desired plane with respect to the position of the operative sealing plane of said heating and pressing belts and further including parallelogram link frame members of equal length pivotally connected to each end of the base member, the other ends of said link frame members being pivotally connected to the supporting rollers for said endless conveyor and to each other by a connecting rod of a length substantially equal to the length of the base frame member, and means to adjust the angular position of said link frame members with respect to said base member and thus adjust in parallel planes the position of said conveyor with respect to said sealing means.

6. A package sealing machine comprising, in combination, endless conveyor means for moving a package to be sealed through the machine, means for sealing the sealable portions of the package as it is moved by said conveyor, said sealing means including a plurality of endless heating and pressing belts adapted to engage the sealable portions of the package, the operative plane of said heating and pressing belts being fixed in said machine, said conveyor being supported on an adjustable parallelogram framework including a base member fixed to the machine in a desired plane with respect to the position of the operative sealing plane of said heating and pressing belts and further including parallelogram link frame members of equal length pivotally connected to each end of the base member, the other ends of said link frame members being pivotally connected to the supporting rollers for said endless conveyor and to each other by a connecting rod of a length substantially equal to the length of the base frame member, said connecting rod being slightly variable in effective length to adjust the tension of said endless conveyor supported on said supporting rollers, and means to adjust the angular position of said link frame members with respect to said base member and thus adjust in parallel planes the position of said conveyor with respect to said sealing means.

7. A package sealing machine comprising, endless conveyor means for moving a package to be sealed through the machine, means for sealing the sealable portions of the package as it is moved by said conveyor, said sealing means including a plurality of endless heating and pressing belts adapted to engage the sealable portions of the package, the operative plane of said heating and pressing belts being fixed in said machine, said conveyor being supported on an adjustable parallelogram framework, said parallelogram framework including a base member fixed to the machine in a desired plane with respect to the position of the operative sealing plane of said heating and pressing belts and further including parallelogram link frame members of equal length pivotally connected to each end of the base member, the other ends of said link frame members being pivotally connected to the supporting rollers for said endless conveyor, said other ends of said link frame members being also pivotally connected to each other by a reversely threaded connecting rod of a length substantially equal to the length of the base frame member whereby the rotation of said rod will be effective to vary the tension of the endless conveyor supported on said conveyor rollers, and means to adjust the angular position of said link frame members with respect to said base member and thus adjust in parallel planes the position of said conveyor with respect to said sealing means.

8. A package sealing machine comprising, endless conveyor means for moving a package to be sealed through the machine, means for sealing the sealable portions of the package as it is moved by said conveyor, the position of said sealing means in the machine being fixed, said conveyor being supported on an adjustable parallelogram framework, said parallelogram framework including a base member fixed to the machine in a desired plane with respect to the position of said sealing means and further including parallelogram link frame members of equal length pivotally connected to each end of the base member, the other ends of said link frame members being pivotally connected to the supporting rollers for said endless conveyor and to each other by a connecting rod of a length substantially equal to the length of the base frame member, and means to adjust the angular position of said link frame members with respect to said base member and thus adjust in parallel planes the position of said conveyor with respect to said sealing means, said last named means to adjust consisting of a rotatable threaded shaft pivotally connected at one end to one of said link frame members and engaging along its length a threaded collar pivotally supported from said base member.

EARL B. DOOLIN.

REFERENCES CITED

The following references are of record in the file of this patent:

UNITED STATES PATENTS

| Number | Name | Date |
|---|---|---|
| 1,762,885 | Oppenheim | June 10, 1930 |
| 2,252,105 | Waters | Aug. 12, 1941 |
| 2,253,036 | Kimple | Aug. 19, 1941 |

OTHER REFERENCES

Doughboy, Sealers Published by the Dairyland Farmer Press, New Richmond, Wisconsin, received in Patent Office December 9, 1946, page 18.